United States Patent
Tijssen

(10) Patent No.: US 9,940,014 B2
(45) Date of Patent: Apr. 10, 2018

(54) CONTEXT VISUAL ORGANIZER FOR MULTI-SCREEN DISPLAY

(71) Applicant: Adobe Systems Incorporated, San Jose, CA (US)

(72) Inventor: Remon Tijssen, Mill Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 609 days.

(21) Appl. No.: 13/887,197

(22) Filed: May 3, 2013

(65) Prior Publication Data

US 2014/0331141 A1 Nov. 6, 2014

(51) Int. Cl.
| G06F 3/0482 | (2013.01) |
| G06F 3/0488 | (2013.01) |
| G06F 3/14 | (2006.01) |
| G06F 17/30 | (2006.01) |

(52) U.S. Cl.
CPC ........ G06F 3/04883 (2013.01); G06F 3/0482 (2013.01); *G06F 3/1423* (2013.01); *G06F 17/30873* (2013.01)

(58) Field of Classification Search
CPC .... G06F 3/04883; G06F 3/0482; G06F 3/017; G06Q 10/101; H04M 2201/38; G01S 7/04

See application file for complete search history.

(56) References Cited

U.S. PATENT DOCUMENTS

| 5,627,936 | A | * | 5/1997 | Prasad et al. | 386/253 |
| 5,835,094 | A | * | 11/1998 | Ermel et al. | 715/848 |
| 6,333,753 | B1 | * | 12/2001 | Hinckley | 715/768 |
| 6,396,477 | B1 | * | 5/2002 | Hinckley et al. | 345/163 |
| 7,532,196 | B2 | * | 5/2009 | Hinckley | 345/156 |
| 7,945,589 | B1 | * | 5/2011 | Weiss et al. | 707/795 |
| 8,464,164 | B2 | * | 6/2013 | Hon et al. | 715/753 |
| 8,701,018 | B1 | * | 4/2014 | Keel et al. | 715/751 |
| 8,924,869 | B2 | * | 12/2014 | Fellman | 715/762 |
| 9,035,949 | B1 | * | 5/2015 | Oberheu et al. | 345/440 |
| 9,053,462 | B2 | * | 6/2015 | Cadiz et al. | |
| 2004/0104947 | A1 | * | 6/2004 | Schmitt | 345/859 |
| 2004/0193413 | A1 | * | 9/2004 | Wilson et al. | 704/243 |
| 2005/0060722 | A1 | * | 3/2005 | Rochette et al. | 719/319 |
| 2005/0091316 | A1 | * | 4/2005 | Ponce | H04L 63/104 709/205 |
| 2006/0041847 | A1 | * | 2/2006 | Maw | 715/793 |
| 2007/0101256 | A1 | * | 5/2007 | Simonyi | 715/511 |

(Continued)

*Primary Examiner* — Rinna Yi
(74) *Attorney, Agent, or Firm* — Shook, Hardy & Bacon L.L.P.

(57) ABSTRACT

In various example embodiments, a system and method for context visual organization for multi-screen display are provided. In example embodiments, assets are retrieved from one or more external sources. The assets are organized into containers that are viewable across multiple display devices that function as a single display. Each of the containers includes a portion of the plurality of assets that correspond to a context of the container. The assets are displayed in their respective containers across the multiple display devices. An indication of a touch gesture applied to one of the multiple display devices to manipulate an object presented on the multiple display devices is received. An action based on the touch gesture is performed.

16 Claims, 17 Drawing Sheets

(56) References Cited

U.S. PATENT DOCUMENTS

| | | | |
|---|---|---|---|
| 2007/0124503 A1* | 5/2007 | Ramos | G06F 3/017 709/248 |
| 2008/0222658 A1* | 9/2008 | Allen et al. | 719/320 |
| 2009/0089676 A1* | 4/2009 | Finkelstein | G06F 17/30058 715/719 |
| 2009/0144642 A1* | 6/2009 | Crystal | G06F 3/04817 715/764 |
| 2009/0309846 A1* | 12/2009 | Trachtenberg et al. | 345/173 |
| 2010/0083165 A1* | 4/2010 | Andrews et al. | 715/784 |
| 2010/0248787 A1* | 9/2010 | Smuga | G06F 3/0482 455/566 |
| 2010/0257473 A1* | 10/2010 | Kang | 715/769 |
| 2011/0066981 A1* | 3/2011 | Chmielewski | G06F 3/0482 715/834 |
| 2011/0083111 A1* | 4/2011 | Forutanpour | G06F 1/1694 715/863 |
| 2011/0090255 A1* | 4/2011 | Wilson et al. | 345/647 |
| 2011/0164058 A1* | 7/2011 | Lemay | 345/651 |
| 2012/0030628 A1* | 2/2012 | Lee | G06F 3/0486 715/835 |
| 2012/0137227 A1* | 5/2012 | Gerken et al. | 715/747 |
| 2012/0266093 A1* | 10/2012 | Park et al. | 715/769 |
| 2013/0047123 A1* | 2/2013 | May et al. | 715/834 |
| 2013/0103446 A1* | 4/2013 | Bragdon et al. | 705/7.15 |
| 2013/0111606 A1* | 5/2013 | Gu | 726/28 |
| 2013/0166503 A1* | 6/2013 | Chung et al. | 707/610 |
| 2013/0318158 A1* | 11/2013 | Teng et al. | 709/203 |
| 2014/0068501 A1* | 3/2014 | Wu et al. | 715/784 |
| 2014/0104139 A1* | 4/2014 | Buchner | 345/1.3 |
| 2014/0282066 A1* | 9/2014 | Dawson | H04L 65/4038 715/748 |
| 2014/0325373 A1* | 10/2014 | Kramer et al. | 715/740 |

* cited by examiner

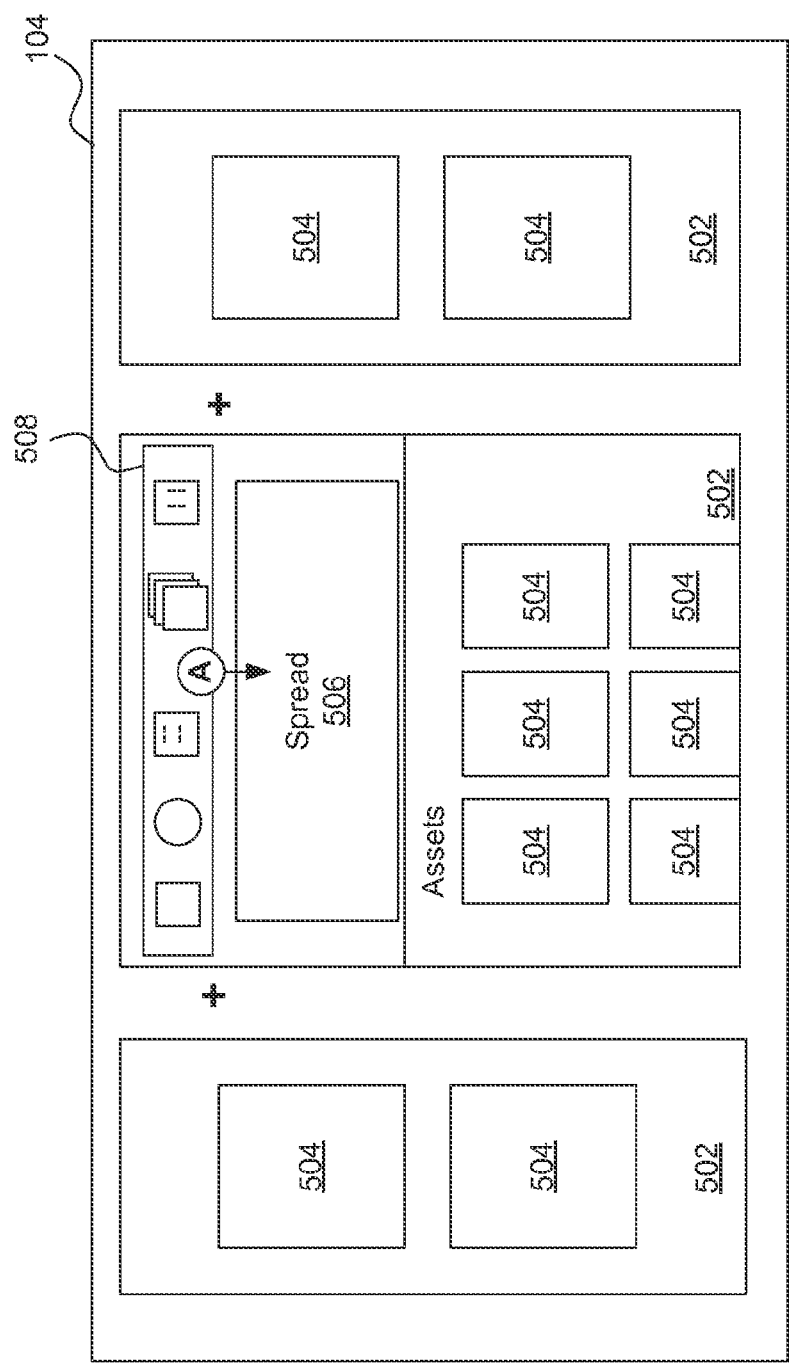

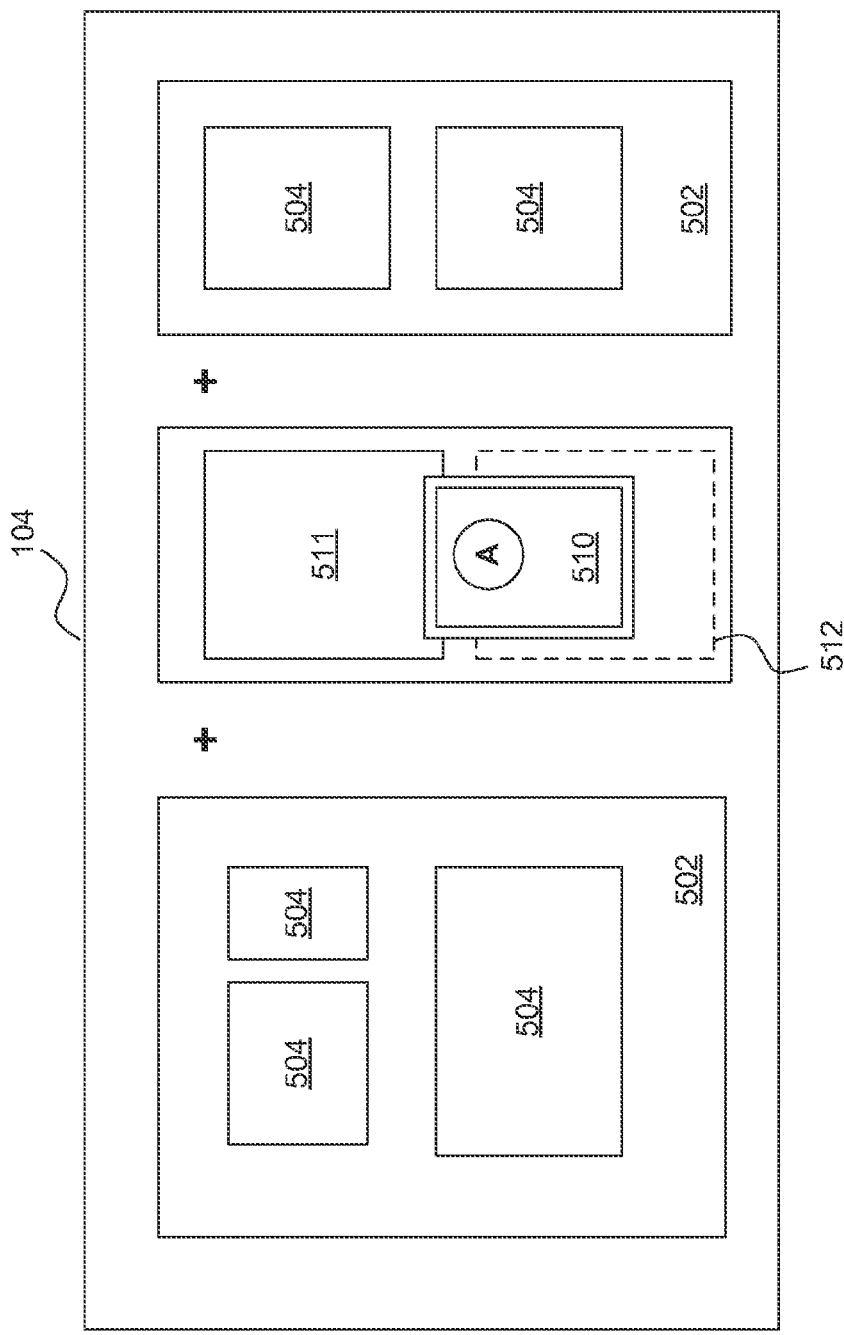

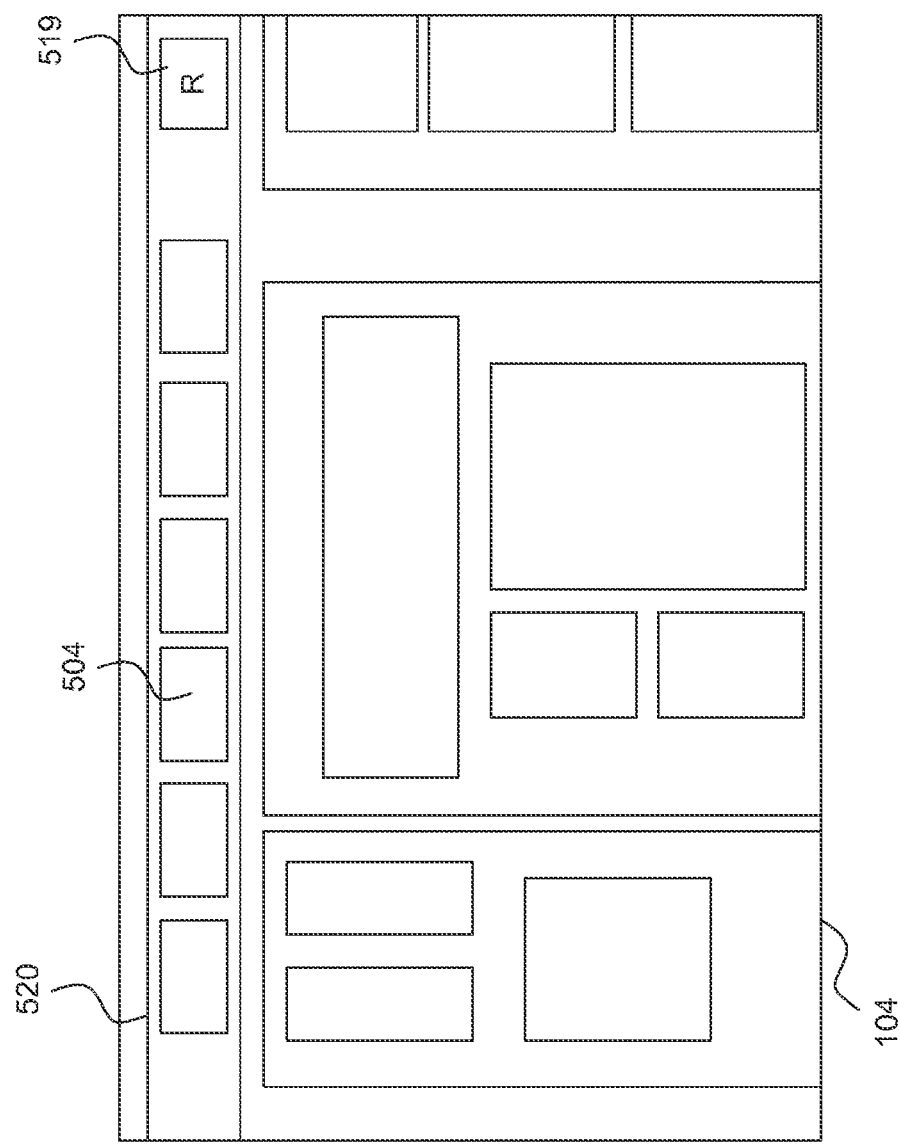

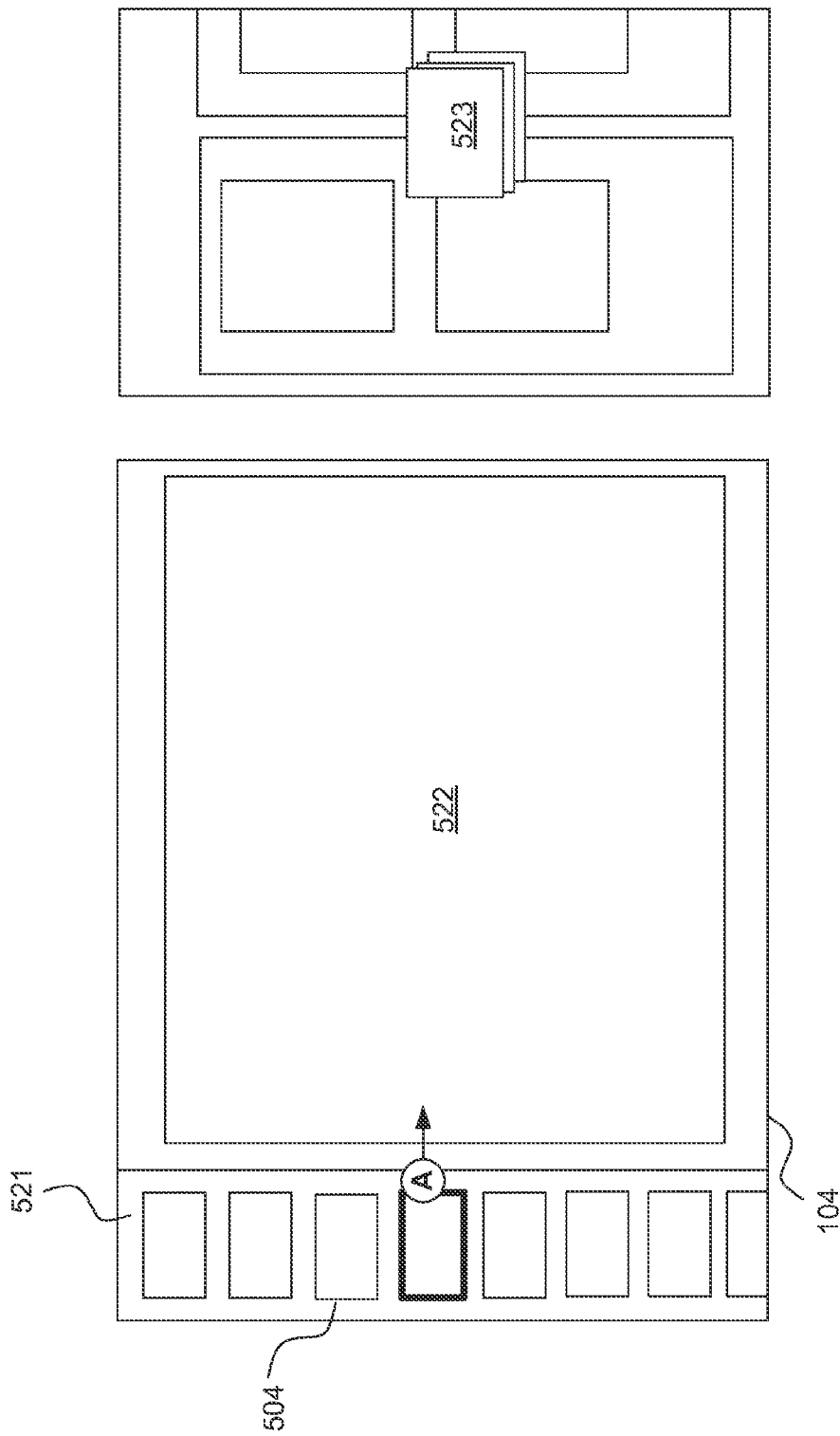

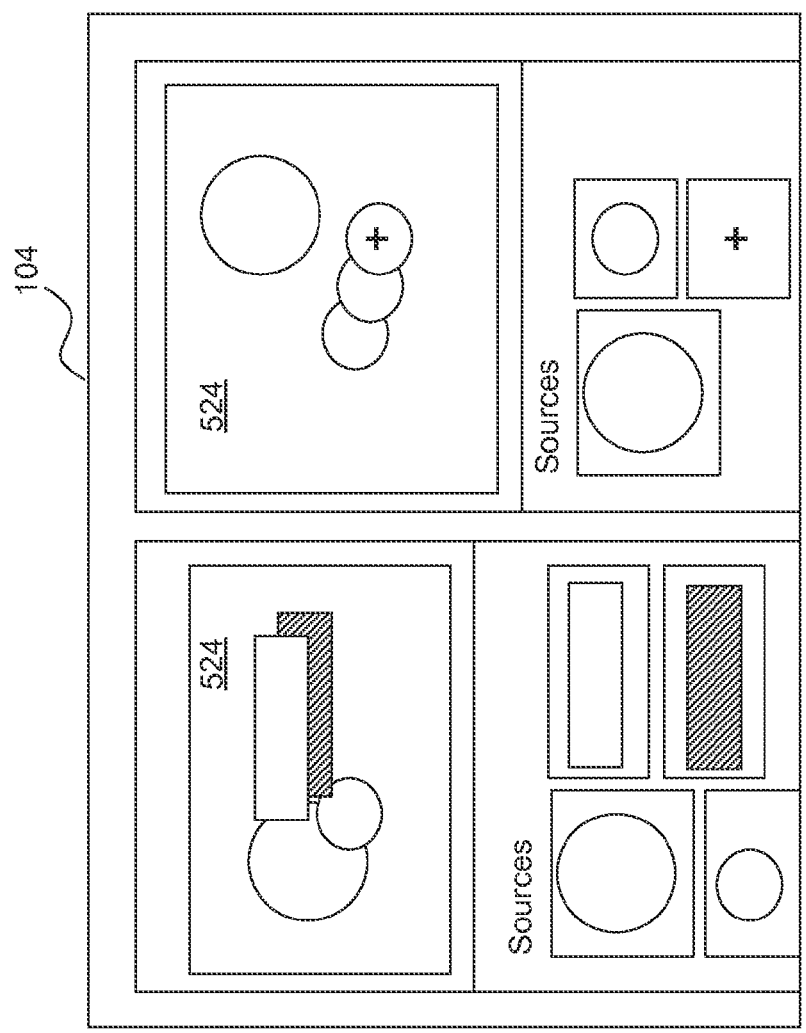

CONTEXT VISUAL ORGANIZER FOR MULTI-SCREEN DISPLAY

FIELD

The present disclosure relates generally to data organization, and in a specific example embodiment, to view, organize, and review assets in a contextual way.

BACKGROUND

Conventionally in an analog world (e.g., printed publications such as magazines), users may collect photos and printouts. These photos and printouts may then be organized using pinboards on walls and light tables. However, the process is labor intensive, often not up-to-date, and adding related assets cannot occur fast enough to be effective at a current moment which may break planning and creative processes of these collaborative sessions.

BRIEF DESCRIPTION OF DRAWINGS

Various ones of the appended drawings merely illustrate example embodiments of the present invention and cannot be considered as limiting its scope.

FIG. 5A-FIG. 5L illustrate various example screens displayed on one or more display devices that enable organizing and manipulation of assets.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for context visual organizing for multi-screen display. In example embodiments, assets are retrieved from one or more external sources. The assets are organized into containers that are viewable across multiple display devices that function as a single display. Each of the containers includes a portion of the plurality of assets that correspond to a context of the container. The assets are displayed in their respective containers across the multiple display devices. An indication of a touch gesture applied to one of the multiple display devices to manipulate an object presented on the multiple display devices is received. An action based on the touch gesture is performed.

Figure 1:
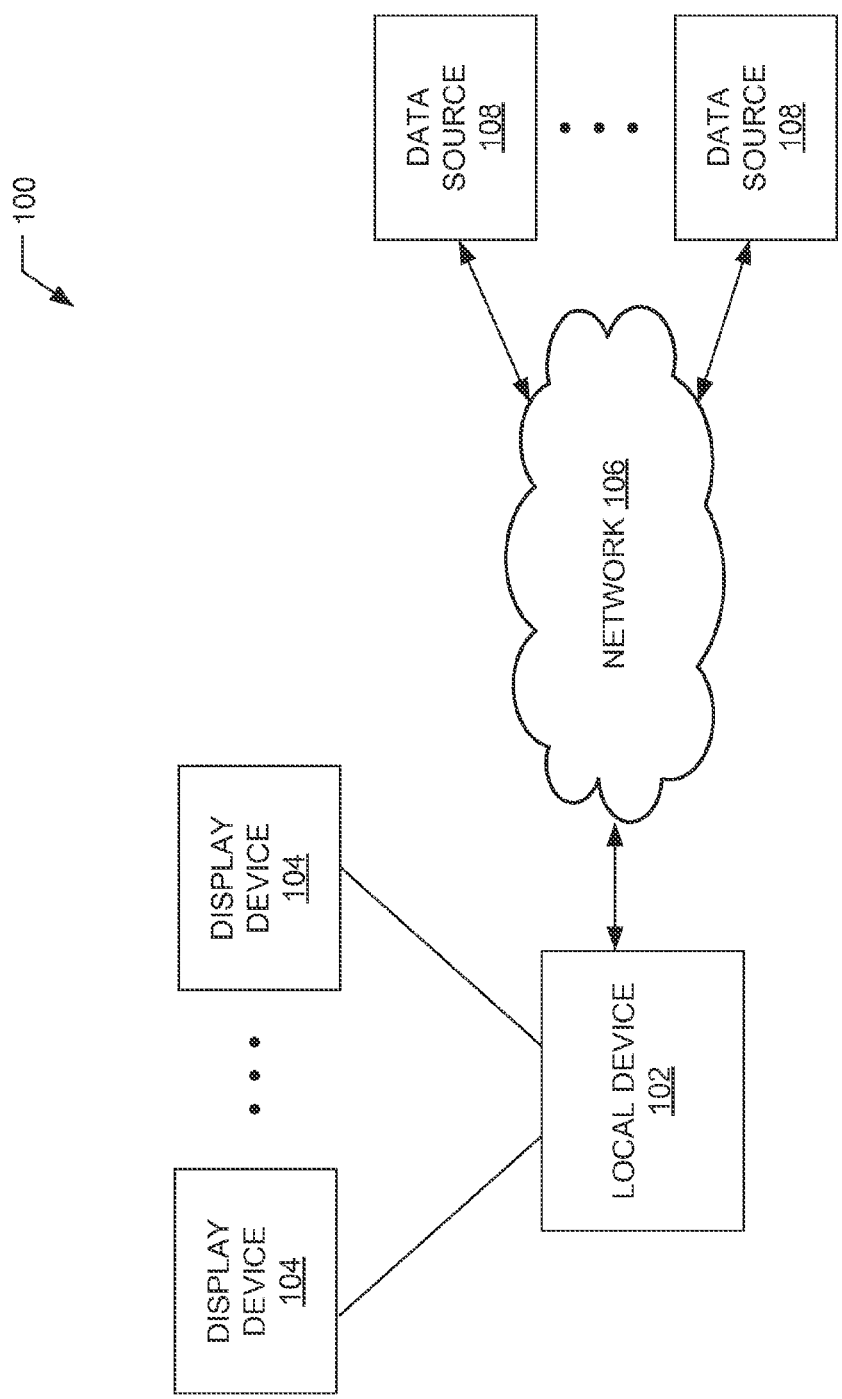
FIG. 1 is a block diagram illustrating an example embodiment of a network architecture of a system used to provide context visual organization for multi-screen display.

With reference to FIG. 1, an example embodiment of a high-level client-server-based network architecture 100 in which embodiments of the present invention may be utilized is shown. A local device 102 is coupled to a plurality of display devices 104 and may be embodied within a particular location (e.g., room). The local device 102 comprises a computing device that includes an application that manages the display of images, files, and other objects on the coupled display devices 104. The local device will be discussed in more detail in connection with FIG. 2 below.

In example embodiments, each display device 104 comprise a computing device that includes a touch-screen that allows one or more users to perform a touch gesture on a screen of the display device 104 in order to manipulate one or more objects shown on the display device 104. The display device 104 receives the touch gesture or touch event from the screen and sends an indication of the gesture to the local device 102. The local device 102 may then perform an action corresponding to the touch gesture (e.g., moving or resizing objects shown on the screens). Thus, example embodiments allows for a collaborative session whereby a plurality of users may interact with the various assets and containers at the same time. In one embodiment, the interactions occur at wall mounted display devices 104 (rather than at a desk or traditional meeting room with tables and chairs) thus allowing the users to stand and move around a room having the plurality of display devices 104.

While the local device 102 is coupled to the plurality of the display devices 104, the local device 102 treats the plurality of display devices 104 as a single display device for purposes of the example embodiments described herein. That is, for example, objects on the screen may be fluidly moved between the different screens of the display devices 104 as if the screens were a single screen. It is noted that any number of display devices 104 may be coupled together in the environment 100.

The objects displayed on the screens of the display device 104 include containers and assets. In accordance with example embodiments, each container is a vertical column with a particular context (e.g., theme or category). Each container contains a plurality of assets that are associated with the context. For example, a container may correspond to a spread (e.g., two pages of a magazine) and contain a plurality of assets which may be considered for use in creating the spread. In other words, the containers provide a location where assets may be gathered, organized, viewed, reviewed, and annotated. Assets can be dragged and dropped into these containers in order to associate each asset with a container. These assets can also be moved between containers. Assets comprise any type of digital file such as, for example, static images, video, interactive three-dimensional models, and text.

The assets may be gathered from any of a plurality of locations. Accordingly, the local device 102 is coupled via a communication network 106 (e.g., the Internet, wireless network, cellular network, Local Area Network (LAN), or a Wide Area Network (WAN)) to a plurality of data sources 108. The data sources 108 may comprise servers, databases, locations on the Internet, or a cloud-based device. As such, the assets in each container may come from a plurality of different data sources 108 and the system of the local device 102 keeps these assets organized in the containers.

It is noted that in example embodiments, the system of the local device 102 does not edit the digital files or assets (e.g., images) nor does the system create documents using the assets. Instead, the documents are created on another device or system. For the magazine example, the spread may be obtained from a data source 108 that is a content management system that creates the spreads using, for example, Adobe® InDesign®. In an example case, the content management system may access the containers and pulls in the assets to be used in creating the spreads. Further still, the content management system may indicate that a spread includes pages (e.g., pages 2 and 3), and the application on the local device 102 may read that composite file (corresponding to the spread) and generate bipmap assets that get displayed in the containers. When one of the composite (spread) files gets updated, a ping may be sent to the local device 102 so that the local device 102 gets automatically updated.

Figure 2:
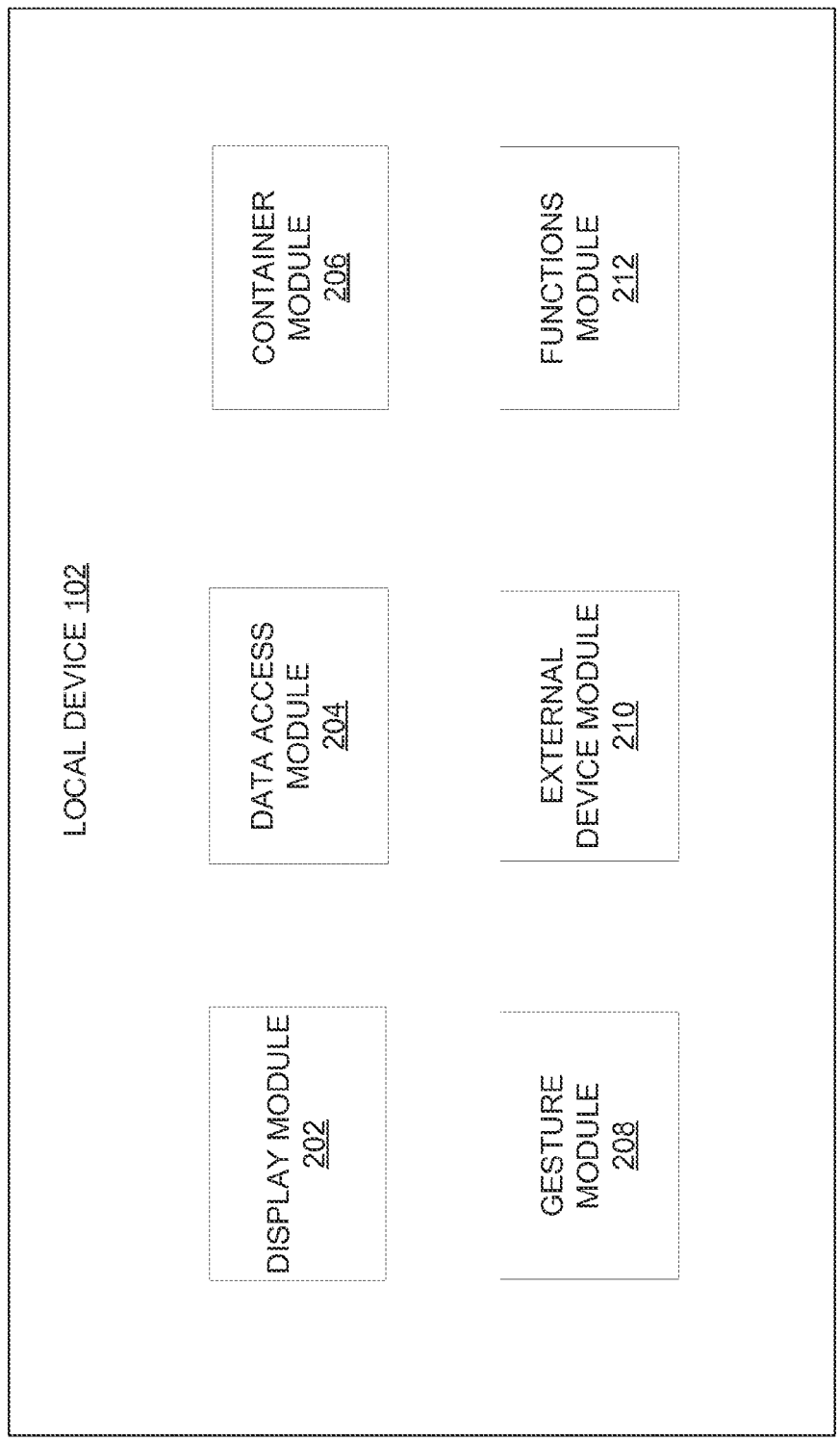
FIG. 2 is a block diagram illustrating an example embodiment of a local device that provides context visual organization.

Referring now to FIG. 2, an example block diagram illustrating multiple components that, in one embodiment, are provided within the local device 102 is shown. In example embodiments, the local device 102 comprises an application or application server that manages the assets and containers displayed across the plurality of display devices 104. To enable these operations, the local device 102 comprises a display module 202, a data access module 204, a container module 206, a gesture module 208, an external device module 210, and a functions module 212. Some or all of the modules in the local device 102 may be configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules.

The display module 202 manages the display of graphics across the plurality of display devices 104. In example embodiments, the display module 202 configures the plurality of display devices 104 to act as a single screen such that objects (e.g., containers, assets) on the display devices 104 may flow fluidly between the screens of the display devices 104 as if the screens were one continuous screen. The display module 202 also provides the graphics to be displayed on the display devices as well as instructions on how to display the graphics. For example, a container or asset may be viewed as full screen (e.g., displayed on the entire screen of one display device 104) or be viewed as full room (e.g., displayed across all the screens on the plurality of display devices 104).

The data access module 204 manages exchange of data with data sources 108. In example embodiments, the assets that correspond to the containers are not stored in the local device 102, but at various data sources 108 (e.g., on the Internet, in data servers) that may be communicatively coupled to the local device 102. When a particular project (e.g., Vogue magazine for month of September) for display is requested at the local device 102, the data access module 202 retrieves the assets for the project from the data sources 108. Additionally, if composite image files are a part of the project (e.g., spreads, composite image files), these composite files may be retrieve from their respective sources, such as a content management system.

The container module 206 manages the organization and layout of the containers that are presented on the display devices 104. In example embodiments, the container module 206 organizes the retrieved assets into their respective assigned containers. Furthermore, the container module 206 may create new containers, resize existing containers, and organize the presentation of assets within the containers. Additionally, the container module 206 may manage the presentation of stacks of assets (e.g., a collection of assets that are gathered together) and flipbooks (e.g., a stack of assets that can be navigated as a collection by a flipping motion).

The gesture module 208 manages operations corresponding to touch gestures by a user of the local device 102. For instance, the user may double tap at a location on the screen of the display device 104 between two existing containers in order to create a new container in that location. In another example, the user may flick an asset (e.g., select the asset with their finger and swipe the finger in a particular direction all in one motion) to move the asset to a final location without having to walk a distance between a start point and the final location while keeping their finger on the asset the entire time. In one instance, the asset may be flicked "down" to a coupled machine (e.g., a central digital drafting table) that functions as an extension of the system. In yet another example, the touch gesture may be a drag and drop gesture that selects and moves an asset from one location to the final location. The gesture module 208 receives an indication of the touch gesture (e.g., the double tap, the flick, the drag and drop) and determines an action to be performed on the corresponding object (e.g., the container or the asset) and causes the action to be performed (e.g., create the new container, move the asset to the final location).

The external device module 210 manages data exchange with an external device within a proximity of the local device 102. The external device may be, for example, a tablet (e.g., iPad) or a smartphone. In example embodiments, when the external device enters a room that contains the local device 102 and the plurality of display devices 104, the external device may automatically connect with the local device 102 via the external device module 210. Once connected various data exchanges may occur. For example, the tablet may provide a grid of one or more images (e.g., assets) which the user can flick to a border of the tablet. The flick motion is a gestural interaction to indicate that the image being flicked should be sent to the screen on the display device 104. Thus, when the asset(s) is flicked on the external device, those assets may appear on a bottom of one of the screens on the display device 102. A position where the assets will land on the screens may be determined by the external device module 210 using on a coordinate remapping that is based on a ratio between a screen of the external device and a total size of the screens of the display devices 104. From there, the user can "grab" an asset and put it into one of the containers (e.g., using a drag and drop motion). When flicking multiple images to the screen from the external device, a stack of images may be created on the screen, which can be reviewed as a flipbook (e.g., double tap on the stack of images and the user can navigate through those images by flipping through them).

Conversely, the external device module 210 may provide data to the external device for display. The containers are super-scalable and can go full screen and full room on the display devices 104. Additionally, the containers can also fit on other screens. For example, one of the containers (e.g., columns) can easily be placed on a smartphone display and the user can swipe thru different containers to view assets on the smartphone.

The functions module 212 manages functions corresponding to toolbars or action buttons provided by the local device 102. For example, the functions module 212 may provide a buttons from which various operations may be triggered. These operations include, by way of example, providing annotation for assets, deleting containers, sharing containers, importing assets, and playing full screen slideshows with container assets.

Although the various components of the local device 102 have been defined in terms of a variety of individual modules, a skilled artisan will recognize that many of the items can be combined or organized in other ways and that not all modules need to be present or implemented in accordance with example embodiments. Furthermore, not all components of the local device 102 may have been included in FIG. 2. In general, components, protocols, structures, and techniques not directly related to functions of exemplary embodiments have not been shown or discussed in detail. The description given herein simply provides a variety of exemplary embodiments to aid the reader in an understanding of the systems and methods used herein.

Figure 3:
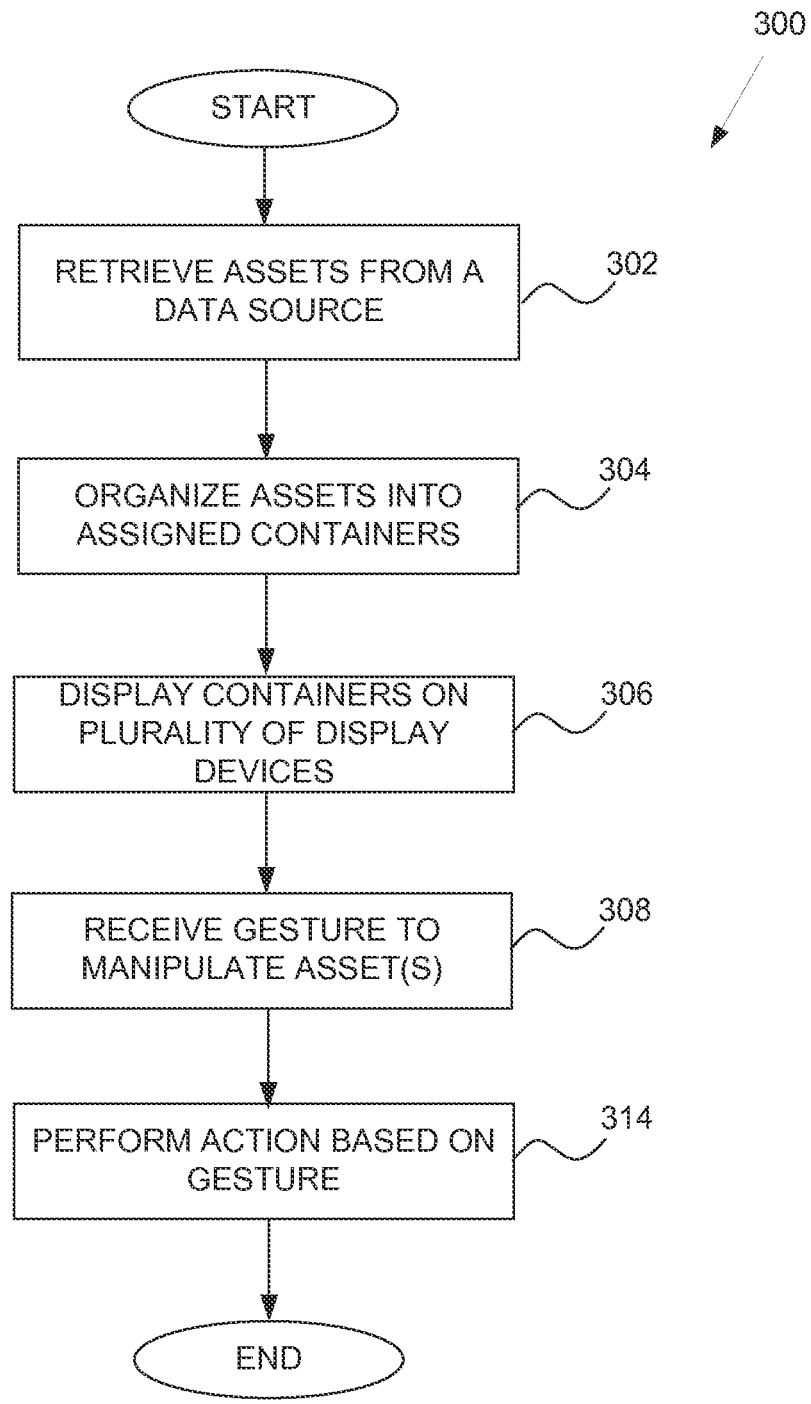
FIG. 3 is a flow diagram of an example high-level method for providing context visual organization.

FIG. 3 is a flow diagram of an example high-level method 300 for providing context visual organization. In operation 302, assets are retrieved from data sources 108. For instance, when a particular project is requested at the local device 102 for display, the data access module 202 retrieves the assets for the project from one or more of the data sources 108. Additionally, if composite files are a part of the project (e.g., spreads, composite image files such as a Photoshopped image), these composite files may be retrieve from their respective sources, such as a content management system.

The retrieved assets are then organized into their assigned containers in operation 304. In example embodiments, the organizing is performed by the container module 206. The assets may be assigned to the containers based on a context corresponding to the container. For example, a container may be associated with two pages of a spread in a magazine. The assets in this container may be collected as potential assets (e.g., images) that may be used in that spread.

In operation 306, the containers with their assets are displayed on the plurality of display devices 104. The display module 202 manages the display of graphics across the plurality of display devices 104 such that the plurality of display devices 104 act as a single display or screen whereby objects (e.g., containers, assets) may flow fluidly between the screens of the display devices 104 as if the screens were one continuous screen. In one embodiment, the containers may be shown as vertical columns on the screens. Each container may include a plurality of assets arranged within the container based on where a user had previously positioned the assets.

An indication of a touch gesture may be received in operation 308. In example embodiments, the gesture module 208 receives the indication of the touch gesture (e.g., double tap, flick, drag and drop, swipe) and determines an action to be performed on the corresponding object (e.g., the container or the asset). The gesture module 208 may then cause the action to be performed (e.g., create the new container, move the asset to the final location) on the screen(s) in operation 314.

Figure 4:
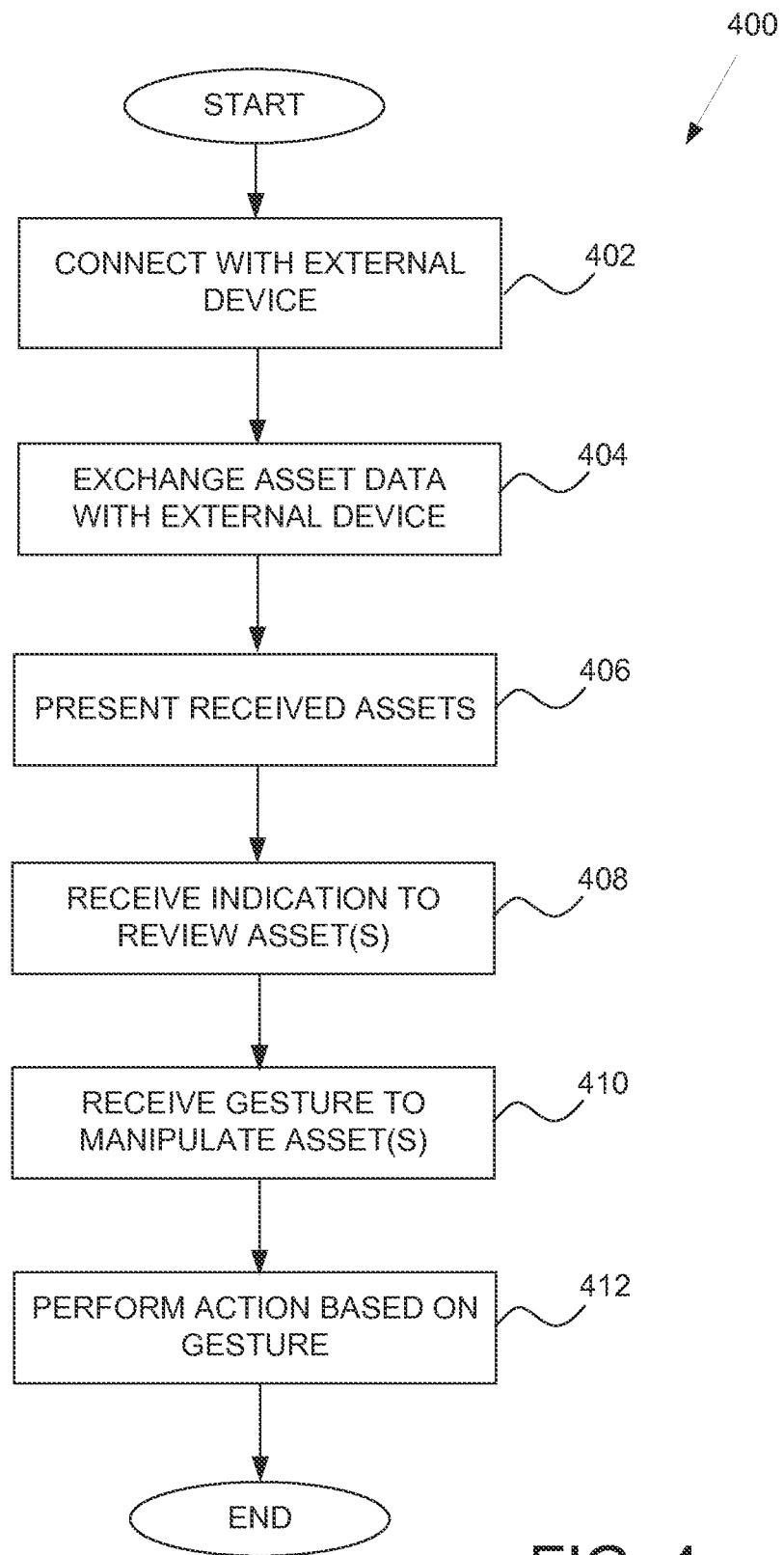
FIG. 4 is a flow diagram of an example high-level method for managing assets received from an external device.

FIG. 4 is a flow diagram of an example high-level method 400 for managing assets received from an external device. In example embodiments, the external device may be a mobile device (e.g., tablet, smartphone). Accordingly when the external device comes within a predetermined proximity of the local device 102 (e.g., enters a room containing the local device 102 and the display devices 104), the external device may automatically connect to the local device in operation 402.

Once connected various data exchanges may occur in operation 404. For example, the external device may provide a grid of one or more images (e.g., assets) which the user can grab and flick to a border of the tablet. That flick is a gestural interaction to indicate that the image being flicked should be sent to the screen on the display device 104. Accordingly, the assets are received by the external device module 210 at the local device 102.

The received assets are presented on the screen(s) in operation 406. For example, when an asset is flicked on the external device, the asset may appear on a bottom of one of the screens on the display device 104. When flicking multiple images to the screen, a stack of images may be presented on the screen.

In operation 408, an indication to review the assets may be received. For example, the stack of assets can be reviewed in a flipbook format by the user when the user double taps on the stack of images. In another embodiment, the assets may be presented on a side or bottom of one of the screens and the user may scroll through the assets.

In operation 410, a touch gesture to manipulate one or more of the assets is received. In example embodiments, the gesture module 208 may receive an indication of the touch gesture to perform a particular action with respect to the asset(s). The touch gesture may trigger movement of one or more of the assets in the stack into a particular container, for instance. The action is then performed in operation 412.

FIG. 5A-FIG. 5L illustrate various example screens displayed on one or more display devices 104 that enable contextual organization and manipulation of assets. These screens are provides for illustrative purposes and do not include all contemplated uses of example embodiments.

Figure 5A:
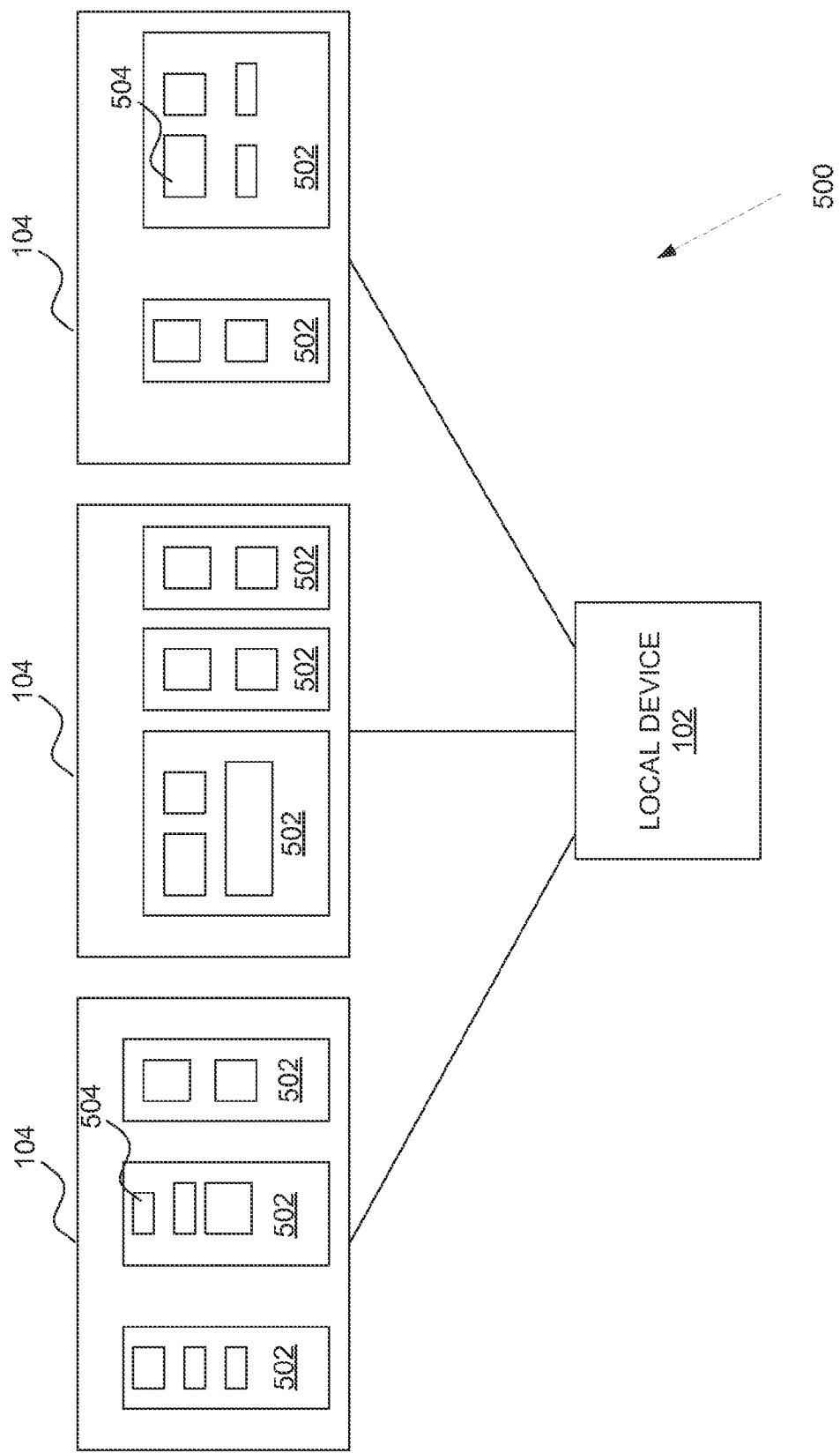

Referring to FIG. 5A, a room environment 500 is shown that includes the local device 102 and three display devices 104. The local device 102 is communicatively coupled to, and exchanges data with, each of the display devices 104. Shown of each of the display devices 104 are a plurality of containers 502 that are laid out in columns. These containers are used to hold and organize any number of assets 504 such as, for example, pictures, videos, text, and drawings in any type of format (e.g., in a column, next to each other). Containers allow a user to organize unrelated assets while having a large level of context. While the containers are shown as being columns, alternative embodiments may contemplate using rows or another of form of organization.

If more assets 504 are in the container 502 then is viewable on the screen, the assets may be scrolled up or down with a further touch gesture. For example, a user may use two or more fingers to perform a scrolling operation. Similarly, horizontal scrolling may be used to scroll through containers by swiping two or more fingers over the containers.

The gesture module 208 may also distinguish between touch gestures of multiple users. This allows for multiple users to use the system at the same time. For example, one user may "grab" an asset (e.g., with a long press on the asset) while a second user scrolls the containers with assets (e.g., with multi-finger swipe) roughly at the same time. The gesture module 208 may distinguish the touch gestures by measuring a distance between the touch points to decide if a second (or third, fourth, etc.) asset is "grabbed" or that scrolling should occur.

In some embodiments, the containers may also be used to run a specific application like a web browser, a drawing application, or a video editor. An applications loaded in the containers allows transformation of the room with multiple display devices 104 to fully focus on the loaded application. For instance, if the container is loaded with a drawing application and the container's size is enlarged to scale across all the display devices 104, the full room becomes a drawing canvas where the user may select different tools and change properties of the tools using a, for example, an external device (e.g., mobile device).

The containers may be scalable and movable depending on the desires of the user. For example, the containers can be scaled up to a single screen on the display device 104 (e.g., full screen view) or multiple connected screens (e.g., full room view).

Figure 5B:
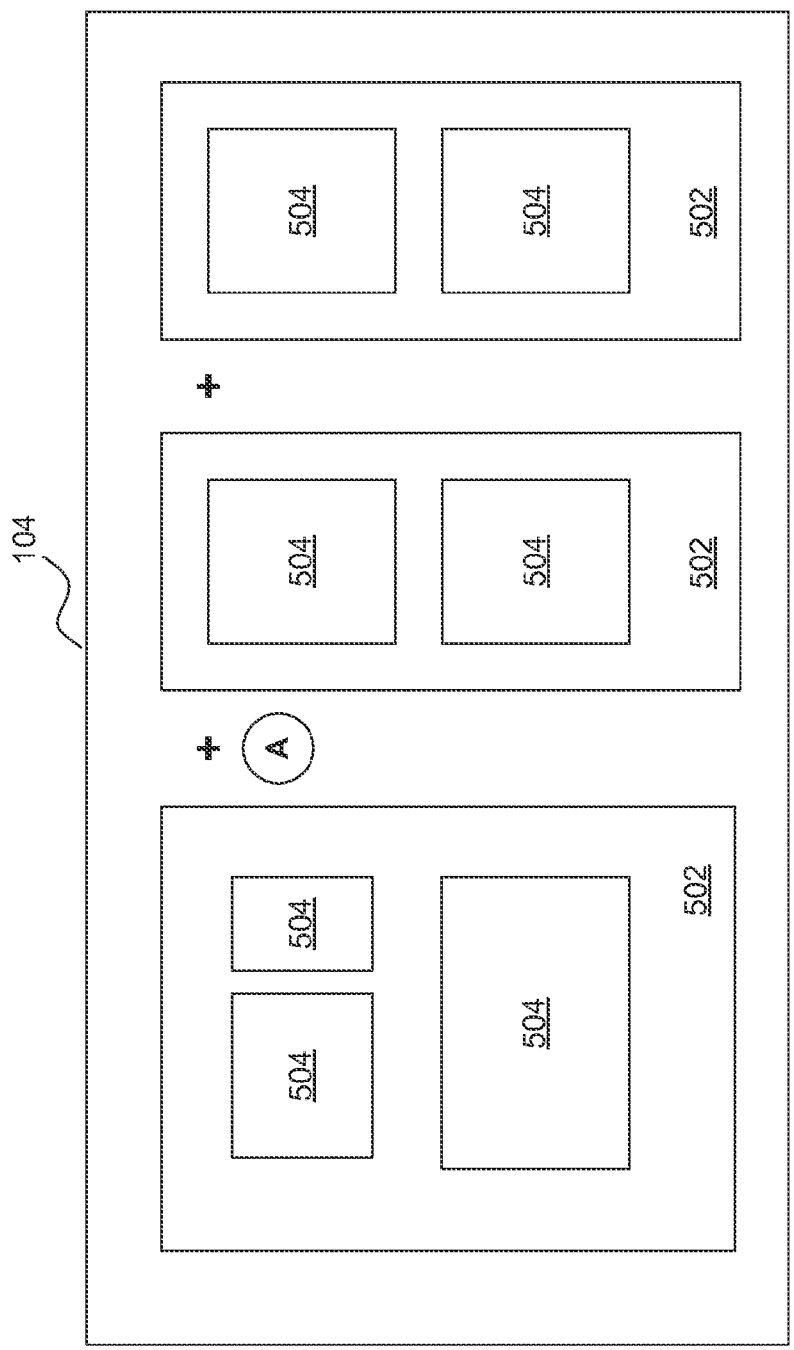

FIG. 5B illustrates one screen on one display device 104. The screen shows three containers 502 each having a plurality of assets 504 arranged therein. When a user provides a touch gesture (e.g., taps or double taps) between two existing containers 502 near a "+" sign (e.g., user taps at a location marked "A"), a new container forms in that location. Thus, instead of conventional methods where the user may need to navigate a menu, the local device 102 provides a simple and intuitive way to create new containers. In some embodiments, the new container is presented by an animation feature whereby the new container appears small and grows in width, thus pushing out the containers 502 on each side of the new container (container on left moves left and container on right moves right, whereby the movement in each direction is half a width of the new container).

Figure 5C:
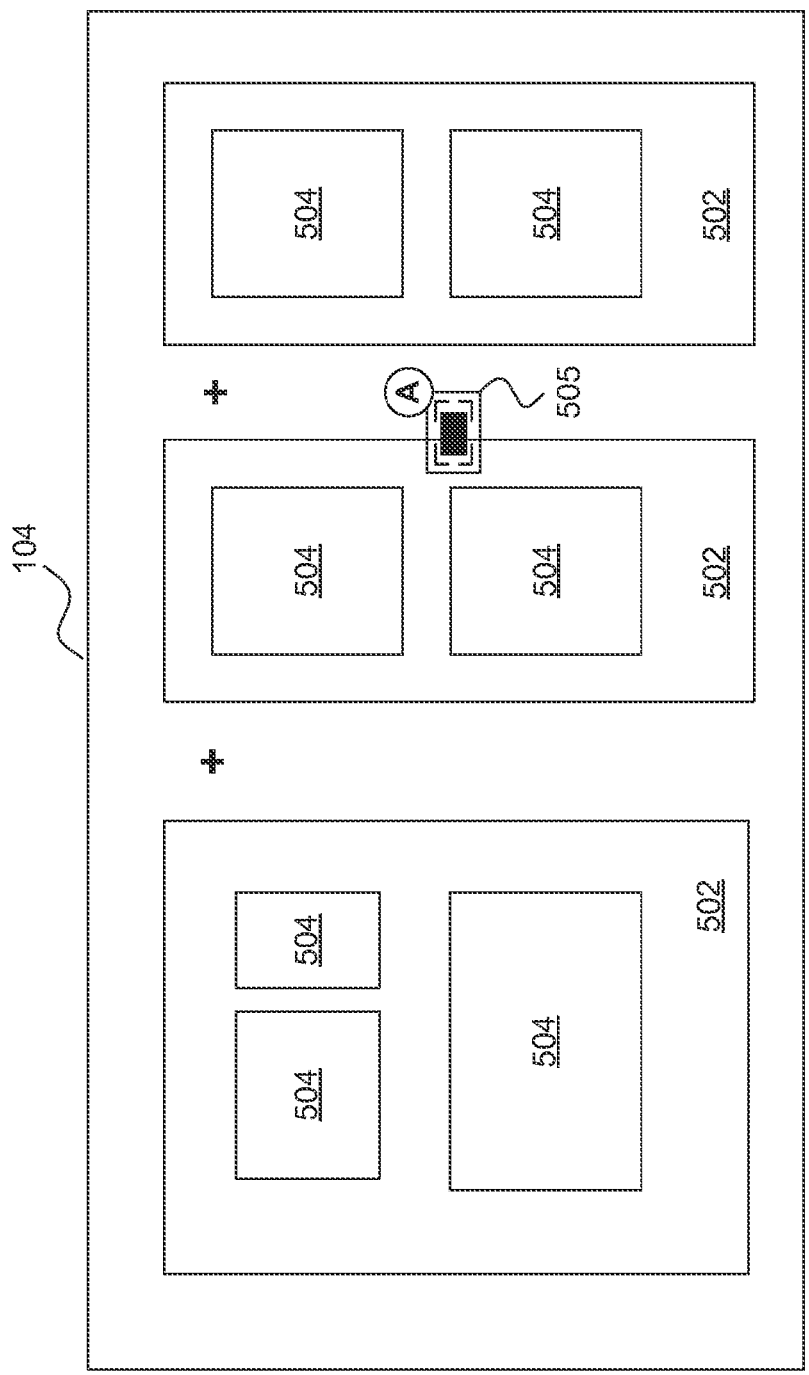

Referring now to FIG. 5C, one of the containers 502 on the screen of the display device 104 may be resized by another touch gesture. In this case, the touch gesture (represented by "A") comprises the user touching the side of the container 502 in order to "grab" the side and drag the side either larger or smaller to resize the container 502. In some embodiments, in addition to resizing when a touch gesture is provided on a side of the container 502, a user interface 505 may be presented near "A" that allows the user to go full screen or full room (i.e., total of all the display devices together) with the container and its contents. For example, a selection of "full room" results in the container 502 being displayed across all three screens of the display devices 102 shown in FIG. 5A. In another embodiment, a flick gesture to the right when dragging a right side of the container may result in the container going full screen or full room.

FIG. 5D illustrates a toolbar that may be presented to a user on the screen. For example, when the user swipes down at "A" at the top of a container, a toolbar containing buttons that trigger actions or functions specifically for the container 502 is revealed. The functions may include, for instance, annotating directly on assets that are in the container 502, deleting the container 502, sharing the container 502, and playing full screen slideshow of assets in the container 502.

Also shown in FIG. 5D is a spread 506. The spread is a composite file that is retrieved from a content management system by the data access module 204. The spread may be, for example, two pages of a magazine that is being worked on by the user. The spread 506 may be illustrated at a top of the container with assets that are contextually grouped for potential use in the spread being organized below the spread 506.

FIG. 5E illustrates the moving of an asset 512. In one embodiment, the user may provide a touch gesture ("A") of a drag and drop to move the asset 510 from one location into another. It is noted that depending on where the new asset 510 is dropped, the container may create or provide multiple columns or rows in the container 502. As shown in FIG. 5E, the new asset 510 is placed below an existing asset 511. An indication of the location 512 where the new asset will be placed may be illustrated to pre-inform the user of the location 512. For example, the indication of the location 512 may be presented in a different color or have an identifying feature (e.g., dashed outline, shading) that distinguishes the location 512 from surrounding areas of the container 502.

While FIG. 5E shows the new asset 510 being placed below an existing asset 511, alternative embodiments may place the new asset 510 next to an existing asset 511, thus forming or extending a row (or creating two columns) in the container 502 (e.g., splitting a horizontal space of the container to show the two assets 510 and 511 next to each other).

Figure 5F:
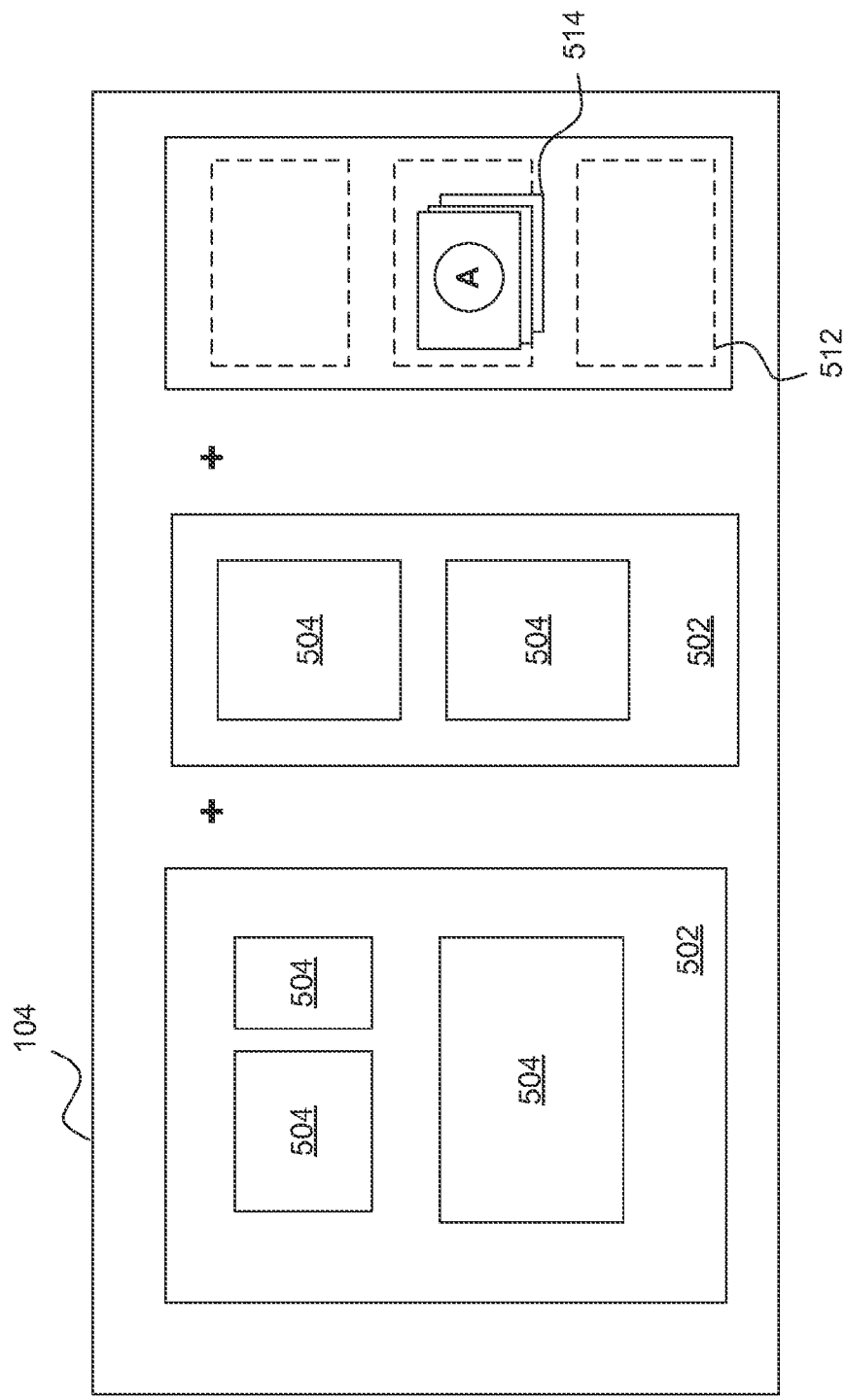

In example embodiments, multiple assets may be placed into a container at one time as shown in FIG. 5F. In these cases, a stack of assets 514 can be dragged and dropped into a container 502. The assets are then automatically positioned with respect to each other (e.g., below one another). As previously discussed in FIG. 5E, indications of locations 512 (e.g., dashed lined area, shaded area) where the assets will be positioned are illustrated to pre-inform the user of where the assets will be positioned. When the user releases the stack of assets 514 (e.g., "drops" the stack), the assets will spread out and enlarge within the locations 512.

Figure 5G:
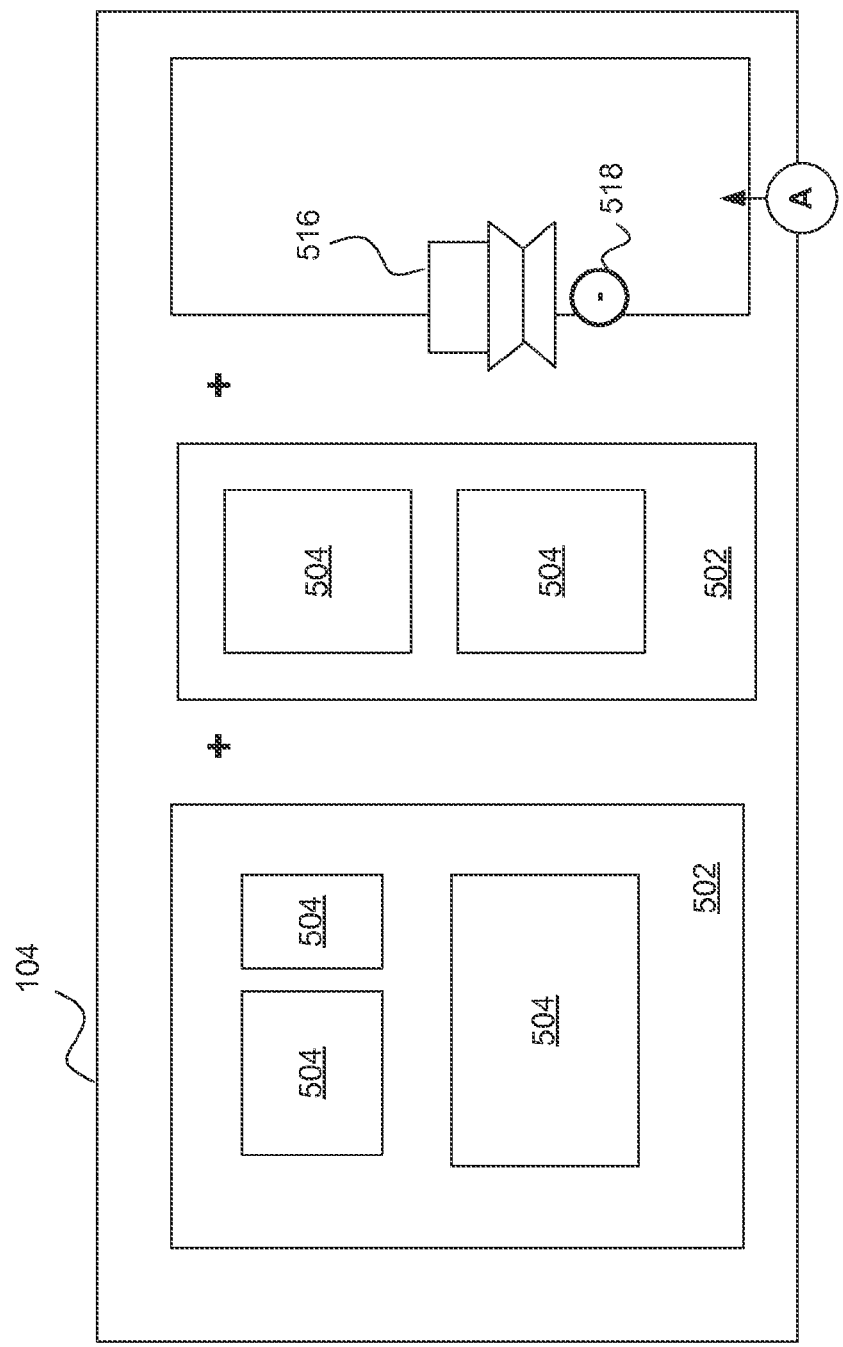

FIG. 5G shows the use of a flipbook 516 on the screen of the display device 104. The flipbook allows the user to review a stack of assets by flipping through them. As discussed above, assets may be added to the container from, for example, an external device. If more than one asset is flicked or moved from the external device to the screen, the assets may appear as a stack. Flicking up from a bottom bar ("A") provides a view of recently added assets to the room. This touch gesture (e.g., flicking up at "A") may provide a draggable flipbook 516. A further touch gesture (e.g., flipping) on the flipbook allows the assets in the flipbook to be reviewed. Additionally, a touch gesture of a pinch zoom may transform the stack of assets into a grid of assets. These assets in the grid or flipbook may be dragged and dropped into the containers 502. Furthermore, a drag handle 518 (or touch gesture) allows the flipbook to be moved to another location (e.g., over another container 502). Moving the flipbook to the bottom bar may remove the flipbook from the screen.

Figure 5H:
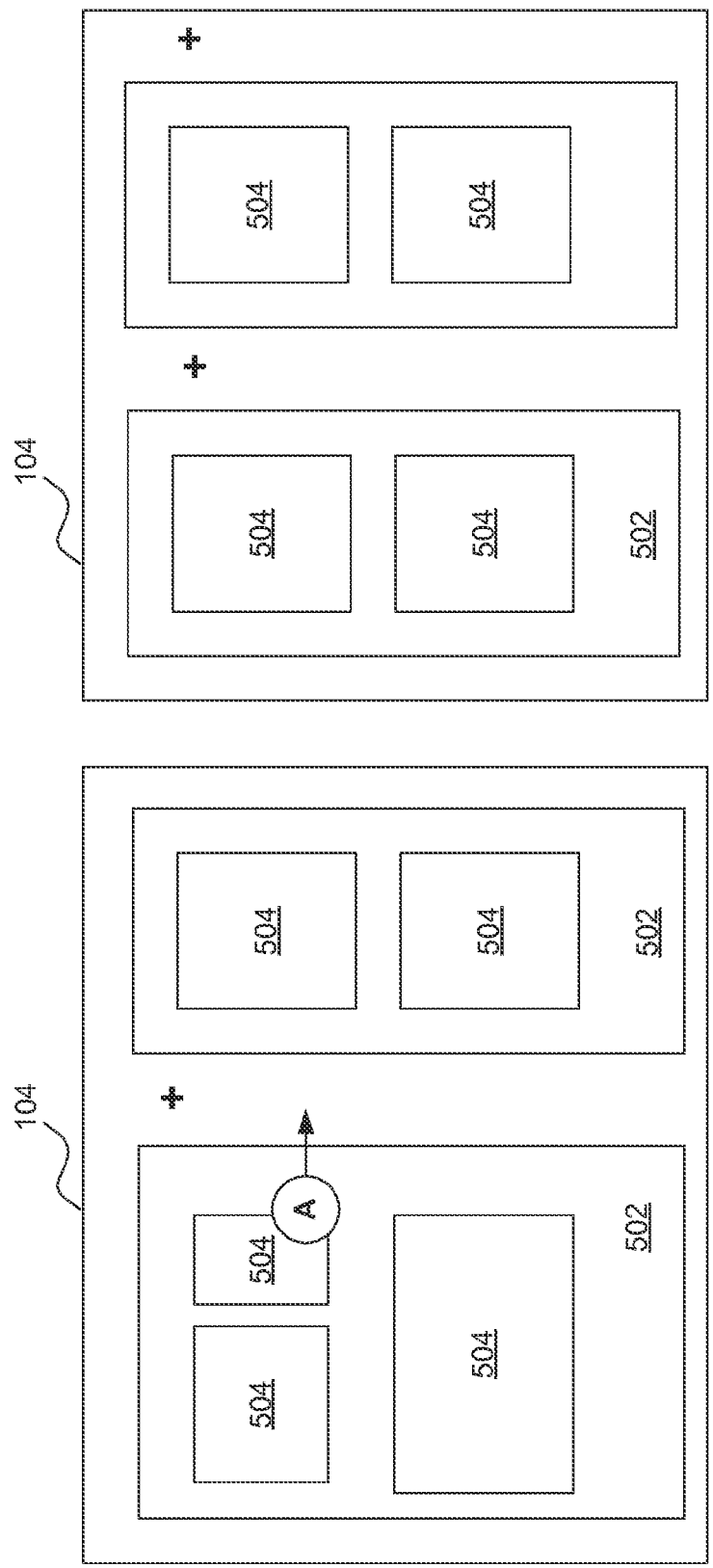

FIG. 5H illustrates an asset flicked across a larger distance. In example embodiments, the screens on the display devices 104 are large (e.g., width may be beyond an arms-length reach). Since there are multiple large screens, the user may not be able to reach a large portion of the display devices 102. If the user desires to move an asset from one screen to another, conventionally, the user may need to hold it and walk with it across the room. To alleviate this issue, a touch gesture of a flick may be used to move the asset to another screen or across the room. Based on the flicking speed (velocity), the gesture module 208 decides where the asset is going to land (i.e., an endpoint on a particular screen of a particular display device 104). In some embodiments, a check may be performed to determine if the endpoint is between two screens. If the determined endpoint is between two screens, the asset may be moved out a little further by, for example, the gesture module 208.

FIGS. 5I and 5J provides a review workflow involving assets 504. For instance, a review button 519 may be provided on a top portion 520 of the screen that is associated with a certain directory with a certain amount of images (e.g., assets). Once the review button 519 is selected, a full screen review session may be initiated as shown in FIG. 5J. The images in the top portion are now presented in a column 521 on a left side of the screen with a middle image (e.g., shown in bold) enlarged in a right portion 522 of the screen for review. In some cases, an image can be selected from the column 521 using a flick (denoted by "A") and moved to an opposite screen (or another screen). Flicking multiple images will automatically create a stack 523 on the opposite screen. The selected image or stack can be grabbed and placed into containers.

FIG. 5K illustrates a photo composite embodiment that may be associated with, for example, a PhotoShop composite image. In this embodiment, each container may include a Photoshop file. The Photoshop file (e.g., the Photoshop composite image) is displayed at a top portion 524 of the screen. Below the Photoshop file are assets collected for the particular Photoshop file (e.g., labeled "Sources"). These assets may or may not be used in creating the corresponding Photoshop file. It is noted, the container allows the user to keep contextually related assets together even before the user actually creates the Photoshop image. Thus, the embodiment shown in FIG. 5K allows the user to visualize better with the ability to go through the corresponding assets while having the Photoshop file right in front of the user.

Figure 5L:
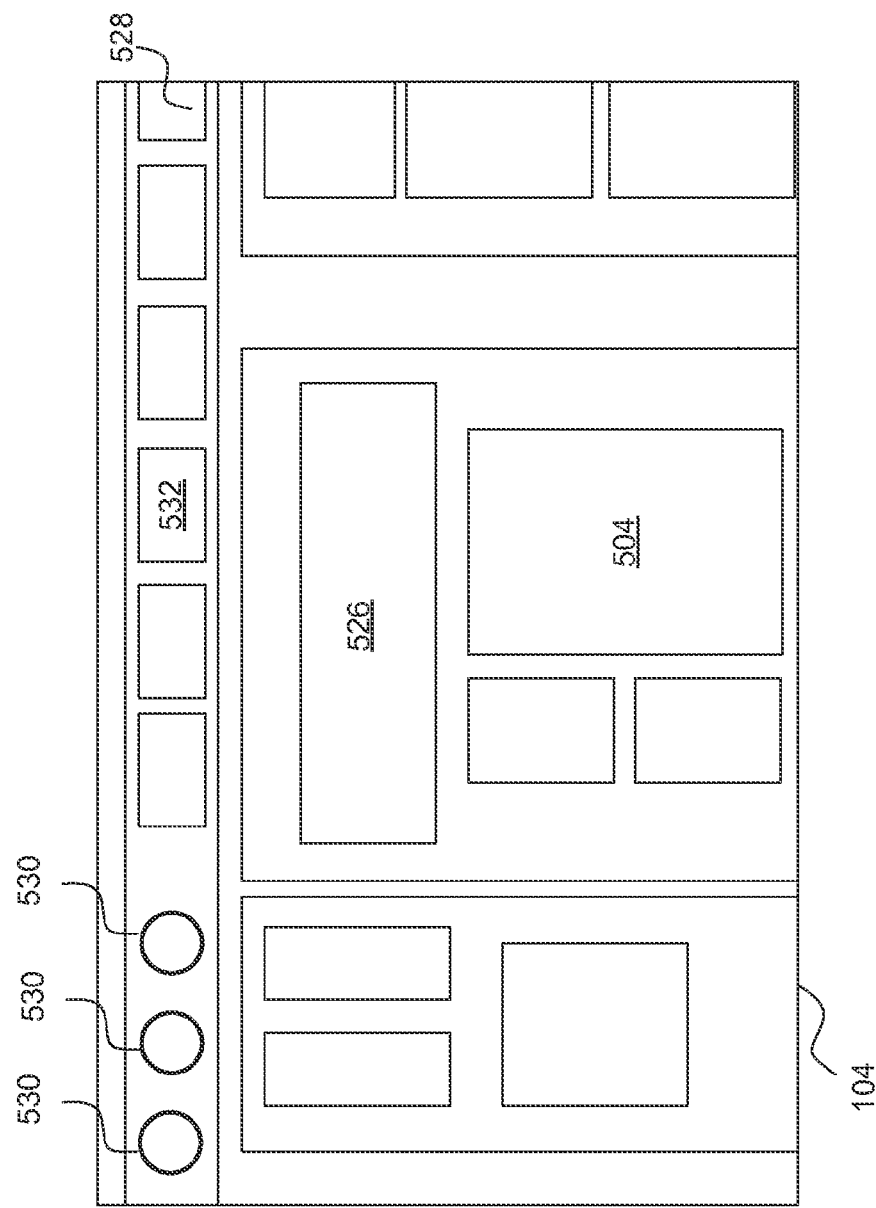

FIG. 5L illustrates another embodiment for receiving and organizing assets. A top area 526 of a container shows a composite file (e.g., a magazine spread) while a bottom portion shows assets 504 that may be used in the process of creating the composite file. Along a top portion 528 of the screen may be an area that provides access to assets. For example, buttons 530 may be presented that when trigger retrieve assets from a local device or import assets from a creative cloud, other users or devices (e.g., shared), or the Internet (e.g., via a web browser). These accessed assets 532 may be displayed in the top portion 528, and can be dragged and dropped into the containers 504.

Figure 6:
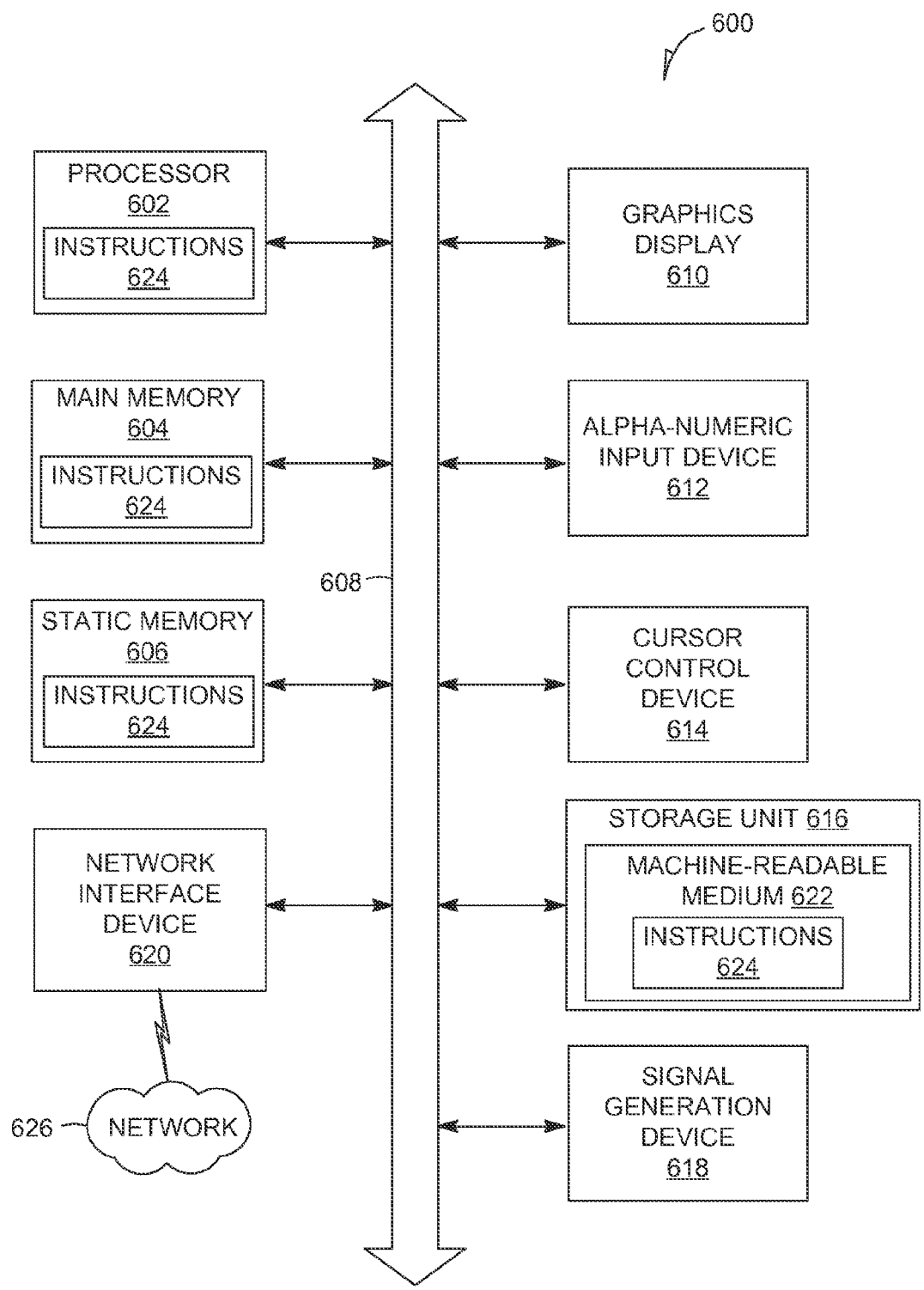
FIG. 6 is a simplified block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a stand-alone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   generating a user interactive collaborative session using multiple display devices that function as a single display;
   retrieving a plurality of assets from a data source for the user interactive collaborative session;
   organizing, by a processor, the plurality of assets into containers that are viewable across the multiple display devices that function as the single display, each of the containers corresponding to a different context, wherein each of the plurality of assets are organized by the processor into at least one of the containers when the processor determines an asset corresponds to a context of the at least one container;
   causing the plurality of assets to be displayed in their containers associated with the corresponding contexts across the multiple display devices that function as the single display;
   automatically connecting an external device to the user interactive collaborative session based on a proximity of the external device to a local device coupled to the multiple display devices, the external device corresponding to a user participating in the user interactive collaborative session;
   receiving, via the external device, a gestural interaction from the user of the external device directed to at least one asset at the external device;
   determining, by the processor, an endpoint position on at least one of the multiple display devices for the at least one asset received from the external device, the endpoint position based on the gestural interaction and determined using a coordinate remapping based on a ratio between a size of a screen of the external device and a total size of the screens of the multiple display devices; and
   moving the at least one asset, based on the gestural interaction and the endpoint position, across one or more of the multiple display devices to the endpoint position on at least one of the multiple display devices.

2. The method of claim 1, wherein the receiving the gestural interaction from the user comprises receiving a touch gesture that is a drag and drop operation to move the at least one asset into a container where dropped.

3. The method of claim 1, wherein the receiving the gestural interaction from the user comprises receiving a drag and drop operation to move the at least one asset into a container where dropped, the at least one asset being a stack of assets.

4. The method of claim 1, wherein the receiving the gestural interaction from the user comprises receiving a tap operation to create a new container at a location of the tap operation.

5. The method of claim 1, wherein the receiving the gestural interaction from the user comprises receiving a flick operation to move the at least one asset across one or more of the multiple display devices.

6. The method of claim 5, wherein the endpoint position of the at least one asset, as moved is determined based on a velocity corresponding to the flick operation.

7. The method of claim 1, further comprising receiving a swipe to access a tool bar, the tool bar providing functions performable on an object wherein the functions are selected from a group consisting of annotating an asset, deleting a container, sharing a container, and playing full screen slideshow with container assets.

8. The method of claim 1, further comprising presenting a stack of assets as a navigable flipbook.

9. The method of claim 1, further comprising:
   creating a stack of assets based on the gestural interaction, and
   moving the stack of assets as displayed across the multiple display devices based on a second interaction.

10. The method of claim 1, further comprising presenting a composite file that corresponds to one of the containers, the assets in the one container available for use in creating the composite file.

11. A non-transitory machine-readable storage device in communication with at least one processor, the non-transitory machine-readable storage medium storing instructions which, when executed by the at least one processor of a local device, cause the local device to perform operations comprising:
   retrieving a plurality of assets from a data source for display in a user interactive collaboration session;
   organizing, by the at least one processor, the plurality of assets into containers that are viewable across multiple display devices that function as a single display, each one of the containers corresponding to different contexts, wherein each of the plurality of assets are organized into the containers when the at least one processor determines an asset corresponds to a context of the at least one container;
   causing the plurality of assets, as organized based on determinations of the at least one processor, to be displayed in their containers across the multiple display devices in the user interactive collaboration session;
   automatically connecting an external device to the user interactive collaborative session based on a proximity of the external device to the local device coupled to the multiple display devices;
   based on a flick operation performed to two or more assets at the external device, receiving the two or more assets, wherein the flick operation indicates a selection of the two or more assets and a movement of the two or more assets in a direction toward the multiple display devices;
   determining, by the at least one processor, an endpoint position at one of the multiple display devices for the two or more assets based on the flick operation, the endpoint position further determined using a coordinate remapping based on a ratio between a size of a screen of the external device and an aggregated size of the multiple display devices; and moving the two or more assets, based on the flick operation and the endpoint position, across one or more of the multiple display devices and positioning the two or more assets at the endpoint position, wherein the two or more assets are displayed as a stack of images.

12. The non-transitory machine-readable storage device of claim 11, further comprising receiving an indication of a touch gesture that is a drag and drop operation to move an asset of the plurality of assets into a container where dropped.

13. The non-transitory machine-readable storage device of claim 11, further comprising receiving a drag and drop operation to move the stack of images into a container where dropped.

14. The non-transitory machine-readable storage device of claim 11, further comprising receiving a tap operation to create a new container at a location of the tap operation.

15. The non-transitory machine-readable storage device of claim 11, further comprising receiving an indication of a touch gesture that is a flick operation to move an asset across one or more of the multiple display devices.

16. A system comprising:
a processor of a local device;
a data access module, via the processor, to retrieve a plurality of assets from a data source;
a container module to organize, via the processor, the plurality of assets into containers that are viewable across multiple display devices that function as a single display, each one of the containers corresponding a different context, wherein each of the plurality of assets are organized into at least one of the containers when the container module determines each of the plurality of assets corresponds to a context of the at least one container;
a display module to cause, via the processor, the plurality of assets to be displayed in their containers across the multiple display devices;
a gesture module to receive, via the processor, an indication of a touch gesture applied to one of the multiple display devices to manipulate an asset in the plurality of assets displayed on the multiple display devices and to perform an action based on the touch gesture; and
an external device module to, via the processor:
automatically connect an external device to the user collaborative session based on a proximity of the external device,
receive one or more assets from the external device based on a flick operation performed at the external device, wherein the flick operation indicates a selection of the one or more assets and a movement of the one or more assets in a direction toward the multiple display devices,
organize the one or more assets received into a stack of images to be displayed on one of the multiple display devices, and
when the stack of images is received via the external device module, perform a coordinate remapping based on a ratio between a size of a screen of the external device and an aggregated size of screens of the multiple display devices to determine an endpoint position for the stack of images to be displayed on the one of the multiple display devices based on the flick operation, and
wherein the display module causes the stack of images to be displayed on the one of the multiple display devices at the endpoint position.

* * * * *